United States Patent [19]

Di Palma et al.

[11] 4,220,693
[45] Sep. 2, 1980

[54] COMPOSITE SEPARATOR/ABSORBENT

[75] Inventors: Ralph B. Di Palma, New Hyde Park; Anthony Loh, Jr., Croton Falls, both of N.Y.

[73] Assignee: P. R. Mallory & Co. Inc., Indianapolis, Ind.

[21] Appl. No.: 936,303

[22] Filed: Aug. 23, 1978

[51] Int. Cl.² ............................................... H01M 2/18
[52] U.S. Cl. ...................................... 429/133; 429/145
[58] Field of Search ............... 429/133, 135, 144, 145, 429/142

[56] References Cited

U.S. PATENT DOCUMENTS

| 2,994,728 | 8/1961 | Herold | 429/144 |
| 3,235,409 | 2/1966 | Greminger et al. | 136/146 |
| 3,427,206 | 2/1969 | Scardaville et al. | 136/146 |
| 3,615,865 | 10/1971 | Wetherall | 136/146 |
| 3,753,784 | 8/1973 | Eisenacher et al. | 136/145 |
| 3,980,497 | 9/1976 | Gillman et al. | 429/133 |
| 4,072,802 | 2/1978 | Murata et al. | 429/147 |
| 4,078,124 | 3/1978 | Prentice | 429/144 |

*Primary Examiner*—Donald L. Walton
*Attorney, Agent, or Firm*—Ronald S. Cornell; Israel Nissenbaum; Martin M. Glazer

[57] ABSTRACT

An electrochemical cell having a thin separator film such as grafted polypropylene thermally adhered, at limited sites, to a synthetic heat sealable electrolyte absorbent.

12 Claims, 7 Drawing Figures

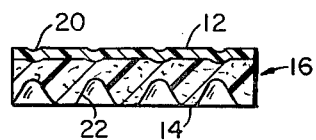
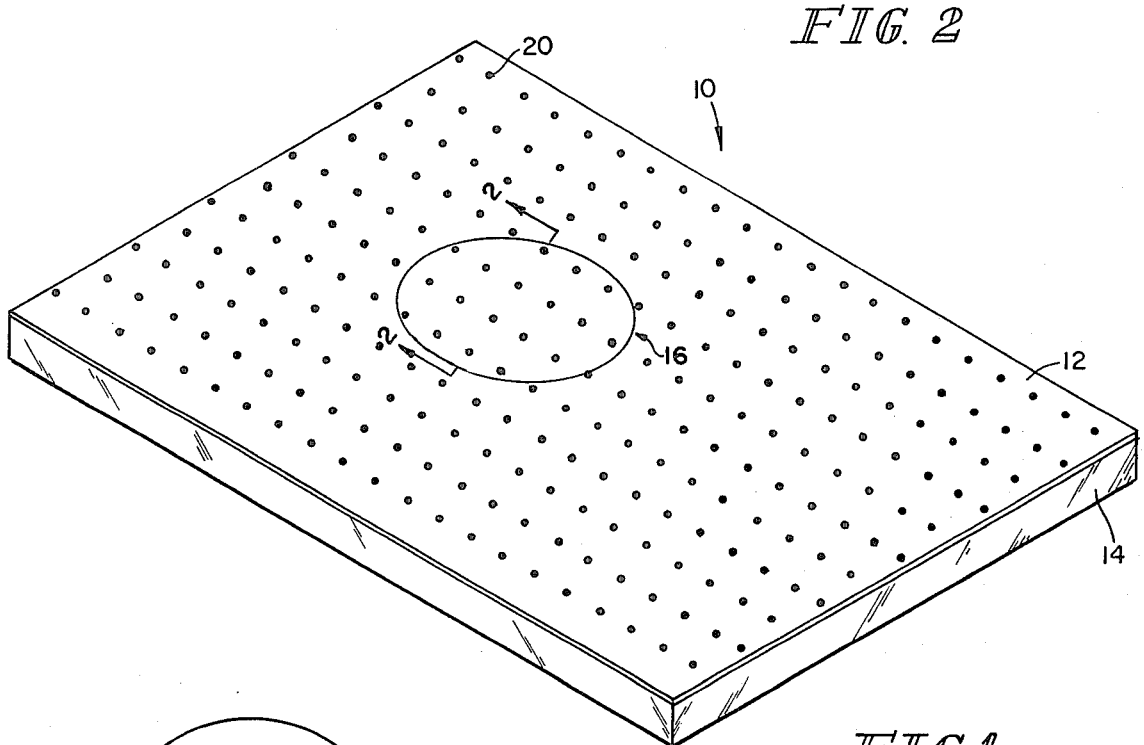
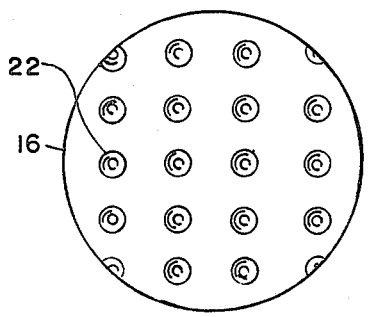
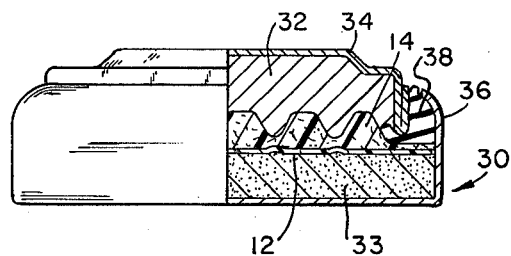

COMPOSITE SEPARATOR/ABSORBENT

This invention relates to thin films for use as separators in electrochemical cells and more particularly to thin grafted polymer films and most particularly to thin grafted polypropylene films.

Separators used in electrochemical cells have the primary function of physically separating anode and cathode while at the same time permitting ionic flow therethrough. In addition to such basic functions, separators should have characteristics which include dimensional stability, high electrolyte absorption and retention, a low ionic impedance, resistance to oxidation and corrosive materials within the cell, reduced soluble material transport and ease of handling during manufacturing processes.

Generally, existing separators are not entirely satisfactory for industrial application and are usually a compromise of the above parameters.

Thin films (up to 5 mils (0.0127 cm) and typically 1 mil (0.00254 cm) thick) of polymers such as polypropylene and polyethylene are unusually stable in corrosive environments such as in the alkaline electrolyte in zinc-/silver oxide and zinc/mercuric oxide electrochemical cells. However, these materials cannot function as separators in their basic thin film form since they are ionically impermeable. Accordingly, they are treated either mechanically to provide pores for ionic permeability or grafted with a material such as acrylic or methacrylic acid after being cross linked by either radiation, plasma grafting or by a chemical initiator such as divinylbenzene. The grafted polymers become cationic exchangers (with the acrylic or methacrylic acid graft) and can thereafter function as separators by allowing hydroxyl ion flow therethrough.

Treated thin polymer films are however difficult to handle during manufacturing processes, since such films, having a typical thickness of about 1 mil (0.00254 cm), cling to processing equipment. As a result, prior art handling expedients usually entailed die cutting or blanking several separator layers, of either the same or different materials, together for providing stability in handling.

Thin grafted polymer films of materials such as grafted polypropylene and polyethylene have more desirable separator characteristics than other thin film materials such as very low ionic impedance and soluble material transport. However they also have characteristics which entail handling and utility difficulties in addition to those encountered with other thin film separators. The grafted polymer films, as a result of the grafts, become very sensitive to moisture with high absorption thereof. During handling of such grafted films, the moisture contained therein tends to distort the film, making such films less suitable for use as separators. Therefore, handling of such films must be under relatively dry conditions. Furthermore, when grafted polymeric films and particularly radiation grafted polypropylene are placed into cells they absorb moisture from the electrolyte, swell up and wrinkle thus further affecting their dimensional stability and reducing their effectiveness as separators.

In the past, in order to obviate this problem encountered with the radiation grafted polyethylene, pure regenerated cellulose (cellophane) was laminated thereon. Residual wetness in the radiation grafted polyethylene held the cellophane when they were rolled together and the thin film graft polyethylene could thereafter be easily handled. However, when the laminate was inserted into a cell, dimensional stability of the laminated separator was not well maintained. Additionally, the cellophane functioned as an additional separator member of higher ionic impedance and raised the total ionic impedance of the separator accordingly. The cellophane also degraded with time which occasionally resulted in internal shorting.

The expedient of using a cellophane backing, even with the above drawbacks, could not however be used with grafted polypropylene since residual wetness in the grafted polypropylene film is insufficient to maintain lamination of such film to a cellophane backing. Accordingly, grafted polypropylene films, while having more desirable separator characteristics of low ionic impedance and greater electrolyte absorption than the grafted polyethylene films have nevertheless not been generally used as separators in electrochemical cells.

Lamination of the graft polypropylene, such as by various adhesives, has the limitation of difficulty of control during manufacture. Additionally, such lamination introduces foreign elements within the cell which may be detrimental to shelf life and performance.

It is an object of the present invention to improve the handling characteristics and dimensional stability of thin film separators and particularly grafted polymer film separators without the need for multiple separator layers or the introduction of foreign materials within the finished cell.

It is a further object to eliminate a step in cell manufacture whereby a separate electrolyte absorbent member is eliminated.

It is another object of the present invention to provide a means whereby thin grafted polypropylene film may be effectively used in an electrochemical cell.

These and other objects and features of the invention will be more evident from the following discussion and drawings in which:

FIG. 1 is an isometric view of a sheet of the composite separator/absorbent of the present invention;

FIG. 2 is a cross sectional view taken along line 2—2 of a circular die-cut of the sheet in FIG. 1;

FIG. 3 is a plan view of the obverse of the circular die-cut of FIG. 1;

FIG. 4 is a partially sectioned view of a button type electrochemical cell containing the composite separator/absorbent die-cut of FIG. 2 and 3;

Figure 5:
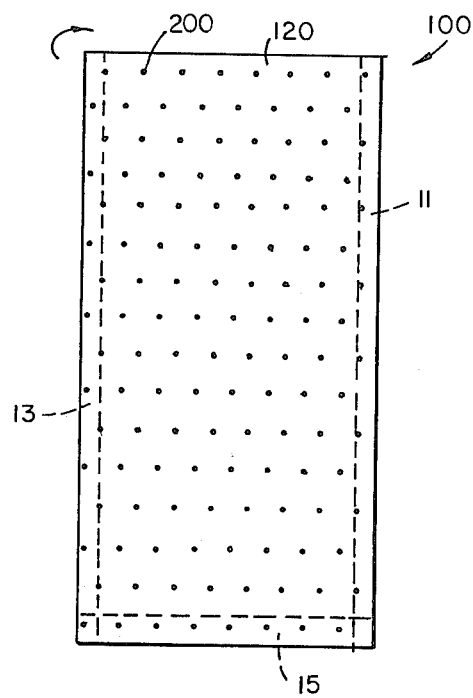
FIG. 5 is a plan view of a sized sheet of the composite separator/absorbent.

Generally, the present invention comprises thermally adhering, at limited sites, a thin polymer film separator to a synthetic, fibrous, heat sealable electrolyte absorbent sheet whereby a composite thin film separator/absorbent sheet is formed and maintained throughout handling and within a finished cell. The adhesion is accomplished without the use of adhesives which are difficult to utilize and which introduce foreign materials within the finished cell. Furthermore adhesive may occasionally, in a cell environment, lose their adhesive properties with resulting separation. Though separator/absorbent composites exist they generally comprise separator coatings on an absorbent rather than a discrete thin film separator which thin film causes handling and utility problems.

Thin polymer film separators have a thickness of up to 5 mils (0.0127 cm) and are typically 1–2 mils (0.00254–0.005 cm) thick. Materials of which such thin film separators are formed include polyethylene, polypropylene, polyvinyl chloride, nylon, acrylonitrile, polyhalogenated such as polyfluorinated carbon resins, polystyrene, grafts of the preceding material whereby they become ion exchangers such as with acrylic or methacrylic acid, and mixtures thereof. The grafted polyethylene and polypropylene and more particularly the radiation grafted polypropylene thin film separators present the greatest handling and dimensional stability difficulties which the present invention mitigates.

Absorbents generally used in electrochemical cells are fibrous mats having the characteristics of (1) absorption and retention of fluid electrolyte, (2) resistance to oxidation, (3) resistance to attack by corrosive materials such as hydroxides, (4) resiliency under compression and (5) low ionic impedance.

In addition to the above characteristics the present invention requires that the absorbent be heat sealable for adhesion with the thin film separator. Accordingly, absorbents of natural fibers such as cotton which are not heat sealable are unsuitable for use in conjunction with the thin film separators. Synthetic thermoplastic absorbents which are thermally bondable such as nonwoven fibers of polyethylene, polypropylene, dynel, rayon, nylon and the like have the requisite thermal characteristics for constructing the composite separator/absorbent.

The thickness of the absorbent which would enable the thin film separators to be readily handled and provide dimensional stability when used in conjunction therewith should not be less than 2 mils (0.005 cm). Preferably, for proper absorption characteristics the thickness is above 3 mils (0.0076 cm) and up to about 30 mils (0.076 cm). Most preferably the absorbents have a thickness of between 10–12 mils (0.025–0.03 cm).

In constructing the composite separator/absorbent of the present invention a sheet of thin polymer film separator such as commercially available 1 mil (0.00254 cm) thick grafted polypropylene film is placed upon a synthetic, fibrous heat sealable electrolyte absorbent such as a 10 mil (0.0254 cm) thick fibrous polypropylene mat sheet. The two sheets are thermally adhered to one another in a limited area such as by spot bonding by rolling and pressing the sheets against contoured heated elements. It is preferred that the thermal bonding be directed from the absorbent side of the composite in order to minimize densification of the separator material which might affect its separator properties. Additionally, if the separator film is not heat sealable, adhesion must be from the absorbent side. Since the absorbent materials used herein, such as polypropylene, are heat sealable, similar parameters of temperatures and heating times as are utilized in effecting the spot bonding are known in the heat sealing art. Polypropylene, for example, has a heat sealing temperature range of about 300°–320° F. (149°–160° C.).

Thermal adhesion herein comprises utilization of heat to adhere separator and absorbent layers at limited sites. The heat may be derived from heated bars, rollers, platens and the like as described in "Thermal heat sealing" by Louis Gross, *Modern Plastics Encyclopedia*, McGraw-Hill N.Y. (1974–75 ed) page 491. Alternatively, other heat inducing methods such as ultrasonic welding ("Ultrasonic Welding" by Jeffrey R. Sherry ibid, page 492), high frequency heat sealing (High-frequency heat sealing, embossing" by Robert D. Farkas, ibid, pages 488–490) and the like may be similarly utilized.

When non-heat sealable materials such as grafted thin polyethylene film sheets are utilized as the separator material, (the grafting itself modifies the polyethylene to a non-heat sealable material) the thermally bondable absorbent is thermally treated in spots to become tacky and provide adhesion thereby.

The thermal spot bonds reduce, to some extent, the absorbent characteristics of the electrolyte absorbent as a result of the reduction of absorbent thickness at the spot bond sites. Accordingly, the spot bonding area should not exceed 40% and preferably should not exceed 10% of the absorbent surface area. Greater area bonding may result in substantial loss of absorbency which may be detrimental to the proper operation of a cell containing such absorbent. The term "spot bonding" is herein defined as meaning bonds in various areas and does not relate to any particular configuration. Thus a grid or strip pattern for example may also be utilized rather than individual "spots" in providing thermally initiated adhesion. Individual "spots" are preferred however since adhesion area is minimized thereby.

The dimensions of the individual bonds should also be minimized while maintaining sufficient adhesion between the separator and absorbent to enable handling to be facilitated, and distortion of the separator within the finished cell to be minimized.

The distance between the bonded areas and thus the total area and number of bonds is determined as a tradeoff between the desirability of providing as few bonds as possible (since the absorbent undergoes loss of absorbency at the bond sites) and the necessity of providing sufficiently numerous bonds to provide adhesion even when a portion thereof is die cut or blanked cut.

During the thermal bonding, the thin film separators are subjected to a high temperature environment with possible lost moisture resulting in an increase of electrical resistance. To remedy such loss, if too great, the separator/absorbent composite may be passed through an emulsifier bath to put moisture back into the separator.

Referring to the drawings, in FIG. 1 a composite sheet 10 (with exaggerated dimensions for clarity) of a thin grafted polypropylene film sheet 12 as an electrochemical cell separator, is spot bonded to an electrolyte absorbent fibrous polypropylene mat sheet by spot bonds 20. A circular section 16 is die-cut from sheet 10 and thereafter removed therefrom for use as a composite separator absorbent in an electrochemical cell. The die cutting is facilitated because of the double layer of separator sheet 12 and absorbent sheet 14 adhered to one another. Composite sheet 10 remains relatively flat and stable during the die cutting in contrast to film sheet 12 which if handled alone would wrinkle and cling to cutting and processing machinery.

The thermal spot bonding from the absorbent mat sheet 14 side, shown in FIGS. 2 and 3 reduces the thickness of the mat sheet 14 at the bond sites by about two-thirds of its original thickness, and is shown in the form of concave depressions 22 (the configuration of the depressions, though shown as circular, is entirely optional). Small areas of the polypropylene film 12 adjacent depressions 22 form spot bonds 20 with such areas being moved slightly out of the original plane of the thin film sheet towards the mat sheet 14 during the adhesion process.

In FIG. 4, cell 30 includes the die-cut circular section of the separator/absorbent composite 16 between anode 32 and cathode 33 with the absorbent sheet 14 being directly adjacent anode 32. Absorbent sheet 14 is compressed by the anode 32 and thereby provides resiliency for maintaining good electrical contact between anode 32 and cell top 34. Though it is accepted practice to have the absorbent directly in contact with the anode, reversal with the absorbent contacting the cathode or inclusion of an additional layer of absorbent at the cathode is also included in the present invention.

The composite separator/absorbent section 16 is held down at its outer periphery by sealing grommet 38 which electrically insulates anode collector or cell top 34 from cathode collector or cell can 36 with the crimp at the upper end of cell can 36 exerting downward pressure to hold the grommet 38 and cell top 34 in position. As a result of the spot bonding between film 12 and mat 14 the two do not separate within the cell as a result of moisture absorbed by the film layer and there is no distortion of the film layer 12 during substantially the entire life of the cell 30. Furthermore, the use of the composite eliminates a separate step of absorbent insertion during the construction of the cell.

Figure 6:
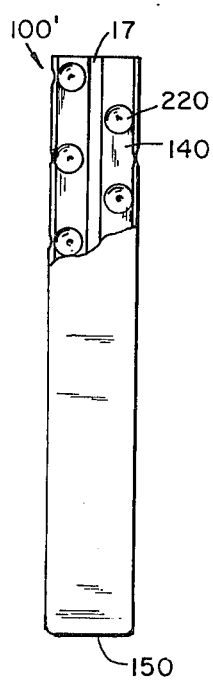
FIG. 6 is a sectioned view of the sheet of FIG. 5 as rolled and heat sealed into a closed end cylinder.

In FIGS. 5 and 6 a composite separator/absorbent sheet 100 is made of the same materials as the separator in FIG. 1 with spot bonds 200 providing the requisite adhesion between thin separator film sheet 120 and absorbent sheet 140. The composite sheet 100 is sized to exact dimensions and is rolled, as indicated by the arrow, into a closed end cylinder 100 with separator film sheet 120 facing outwardly and absorbent sheet 140 facing inwardly. Edge 13 of composite sheet 100 overlaps edge 11 and is heat sealed thereto to form heat seal 17. Edge 15 of composite sheet 100 is thereafter folded and heat sealed to itself to form sealed bottom 150. If desired, such as with gelled anode materials or for greater sealed separation of anode and cathode, composite sheet 100 may be completely closed by heat sealing. Anode nail collector 340 punctures the closed cylinder so formed with a tight seal between anode nail collector 340 and closed cylinder. Closed end cylinder 100' is placed within cylindrical cell 300 and filled with anode material 320. The absorbent sheet 140 is adjacent the anode 320 and the separator sheet 120 is adjacent cathode 330. However, as with the button cell described above in FIG. 4, positioning of the absorbent 140 and the separator 120 may be reversed. Alternatively, an additional absorbent may be utilized between cathode and separator. The sealed bottom 150 of tubular separator/absorbent 100' rests directly on the bottom 361 of cell can 360 without the need for an insulative disc therebetween. Prior art cells generally have either folded or entirely open bottoms rather than sealed bottoms. As a result, an insulative disc or the like is normally required to prevent shorting between anode and cathode through openings in the separator. The construction of the heat sealed cylinder of the present invention eliminates the need for such insulative disc. Furthermore, cylinders in prior art cells sealed with adhesive have a tendency to open with the adhesives therein losing their adherance in the cells environments. The heat sealed cylinders of the present invention maintain their integrity throughout cell life.

Though polypropylene is heat sealable, polypropylene which has been mechanically treated to provide for ionic permeability has been heretofore unsuitable without additional separator materials for use in cells containing mercuric or silver oxide and the like as depolarizers. Mechanically treated polypropylene has a pore size measured in microns which is insufficient to contain the flow the the mercury or silver reaction products which flow eventually shorts out the cell. Accordingly, though polypropylene has desirable heat sealable characteristics whereby it can be made into separator bags it has not generally been used alone in cells having cathodic materials such as mercuric or silver oxide.

The present invention however, provides the necessary handling ease and dimensional stability whereby thin grafted polypropylene films may be utilized in the formation of heat sealed separator bags for use in electrical cells. Since the grafted polypropylene functions as an ion exchanger the "pore" size of such material is in the order of angstroms which is significantly smaller than the microns of the mechanically treated polypropylene. The grafted polypropylene is thus suitable for use with cathode materials such as the aforementioned mercuric and silver oxides without other additional separator layers for containing the mercury or silver reaction products.

Though the present invention has particular utility with cells having mercuric or silver oxide depolarizers and the like, the composite separator/absorbent of the present invention may be used in any cell having a fluid electrolyte and requiring a separator and an absorbent. Examples of common cell systems having alkaline electrolytes for which the present invention has application include $Zn/H_2O$, $Zn/Ag_2O$, $Zn/AgO$, $Zn/MnO_2$, $Zn/Air$, $Cd/HgO$. Additionally, the composite separator/absorbent, because of the stability of material such as polypropylene, may be used in non-aqueous systems such as $Li/MnO_2$, $Li/Ag_2CrO_4$ and other high energy density systems having solid cathode depolarizers.

In order that the present invention may be more completely understood the following examples are presented in which all parts are parts by weight unless otherwise specified. The examples are set forth primarily for illustrative purposes and any specific enumeration of detail contained therein should not be construed as limitations of the invention.

EXAMPLE 1

A 1 mil (0.00254 cm) thick sheet of radiation grafted polypropylene (P6001, RAI Research Corp. New York) is thermally spot bonded to a 54 g/sq. yd. (45.1 gm/meter$^2$) non-woven polypropylene mat having a thickness of about 10 mils (0.0254 cm) (SP102 Kendall Fiber Products Division, Mass.). The bonds form a pattern with a diamond configuration with about 140 bonds/in$^2$ (903/cm$^2$). The thermal bonding is effected by contoured heated rollers at about 320° F. (160° C.), the heat sealing temperature of polypropylene, from the non-woven polypropylene mat side. The diameter of each of the circular bonds is approximately 15–20 mils (0.038–0.050 cm) with the bond areas occupying about 2 to 4.5 percent of the surface area of the polypropylene mat.

The thermally spot bonded composite material has an electrolyte resistance (40% KOH) of 20–30 milliohms/in$^2$ (129–193.5 millohms/cm$^2$), an electrolyte absorption (40% KOH) of from 3–4 gm/gm and is dimensionally stable with dimensional changes being less than 4%.

EXAMPLE II

A button cell having the configuration as in FIG. 4 with the dimensions of 0.445" (1.13 cm) diameter and 0.165 (0.42 cm) height is constructed with an anode of about 0.24 grams amalgamated zinc, a cathode depolarizer primarily of mercuric oxide admixed with graphite and manganese dioxide weighing about 0.85 grams, a 40% KOH solution electrolyte and a disc of the composite material of Example 1 having a diameter of about 0.40" (1.0 cm) as separator/absorbent between anode and cathode. The cell is stored for 3 months at 130° F. (54° C.) and is thereafter discharged at room temperature with a 10kΩ load. The capacity of the cell is about 162 mAH.

EXAMPLE III (PRIOR ART)

A cell is constructed as in Example II but with a 5 mil (0.0127 cm) layer of Acropor (Gelman Instrument Co., Mich., trademark for a nylon fabric with a foamy coating of dynel, polyvinyl chloride and acrylonitrile with finely ground acid ion exchange resin and wetting agents) and a 10 mil (0.0254 cm) layer of Webril (Kendall trademark for a cotton mat) replacing the separator and absorbent respectively of Example II. The cell is stored for three months at 130° F. (54° C.) and is thereafter discharged at room temperature with a 10kΩ load. The capacity of the cell is about 61 mAH.

EXAMPLE IV (PRIOR ART)

A cell is constructed as in Example II but with a 1 mil (0.00254 cm) radiation grafted polyethylene film (Perm-ion 8190-RAI Corp.) on a 2 mil (0.005 cm) thick cellophane layer as the cell separator and a 10 mil thick layer of Webril as absorbent. The cell is stored for 3 months at 130° F. (54° C.) and is thereafter discharged at room temperature with a 10KΩ load. The capacity of the cell is about 145 mAH.

The cell in Examples II and IV are generally comparable, however, under severe storage or usage conditions as in the Examples the cellophane layer in the cell of Example IV degrades with noncomitant reduction of cell capacity.

EXAMPLE V

Figure 7:
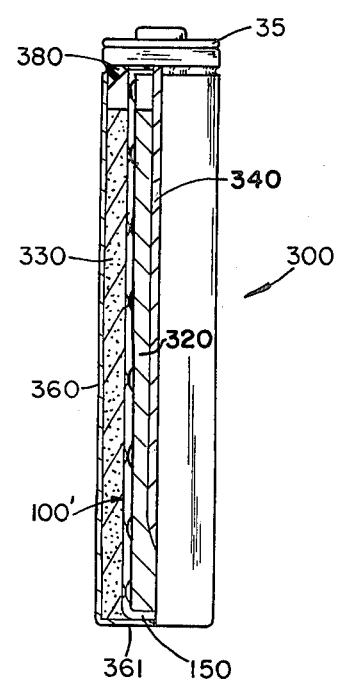
FIG. 7 is a partially sectioned view of the closed end cylinder of FIG. 6 as positioned within a cylindrical electrochemical cell.

Cylindrical cells as in FIG. 7 are constructed each with the dimensions of 0.3" (0.76 cm) diameter and 1.55" (3.93 cm) height, 1.18 grams of amalgamated zinc as the anode and about 3.9 grams of a cathode depolarizer primarily of mercuric oxide admixed with graphite and manganese dioxide. Between anode and cathode depolarizer is a heat sealed tube of the composite material of Example I with the dimensions of about 0.19" (0.48 cm) diameter and about 1.43" (3.63 cm) height.

The cells are discharged under varying discharge conditions with the results given in Table 1.

TABLE 1

| Discharge Cond. (Ma Rate) | 103.75 | 103.75 | 103.75 | 15.0 | 15.0 | 15.0 | 5.0 | 5.0 | 1.25 | 1.25 | 1.25 |
|---|---|---|---|---|---|---|---|---|---|---|---|
| Temp °F. | 70° | 130° | 32° | 70° | 130° | 32° | 70° | 32° | 70° | 130° | 32° |
| Capacity (Mah) | 864 | 813 | 296 | 853 | 852 | 735 | 869 | 778 | 868 | 830 | 839 |

EXAMPLE VI (PRIOR ART)

Cylindrical cells are constructed as in Example V but each with a spirally wound and glued tube of 10 mil (0.0254 cm) thick Synpor (Stokes Molded Products, N.J., trademark for microporous polyvinyl chloride) and 8 mil (0.02 cm) thick Viskon PVA (Chicopee Mills Inc., N.J., trademark for a combination of rayon and vinyl chloride fibers bonded together with regenerated cellulose) as separator and absorbent respectively. The tube is folded closed at the lower end and rests on an insulative disc which covers the bottom of each cell. The cells are discharged under the same conditions as the cells in Example V with the results given in Table 2.

TABLE 2

| Discharge Cond. (Ma Rate) | 103.75 | 103.75 | 103.75 | 15.0 | 15.0 | 15.0 | 5.0 | 5.0 | 1.25 | 1.25 | 1.25 |
|---|---|---|---|---|---|---|---|---|---|---|---|
| Temp °F. | 70° | 130° | 32° | 70° | 130° | 32° | 70° | 32° | 70° | 130° | 32° |
| Capacity (Mah) | 623 | 545 | 114 | 757 | 542 | 383 | 736 | 792 | 472 | 509 | 693 |

The foregoing examples are presented for the purpose of illustrating the invention and its attendant advantages especially with relation to the prior art. It is understood that changes and variations may be made in the construction and configuration of the composite separator/absorbent, such as various bond patterns, thermal adhesion methods and the use of additional layers e.g. absorbent/separator/absorbent and the like. Change may also be made in cell components and configuration without departing from the scope of the present invention.

What is claimed is:

1. An electrochemical cell comprising an anode, a cathode, a fluid electrolyte, with separating means and electrolyte absorbent means between said anode and cathode characterized in that said separating means comprises at least one layer of a thin ionically permeable film comprised of a member of the group consisting of polyethylene, polypropylene, polyvinyl chloride, nylon, acrylonitrile, polyhalogenated carbon resins, polystyrene, ion exchange grafts thereof and mixtures thereof and said electrolyte absorbent means comprises at least one layer of a synthetic non-woven, fibrous, thermally bondable mat wherein said thin film layer and said thermally bondable non-woven mat layer have contiguous surfaces between said anode and cathode with said surfaces being thermally adhered to one another by heat seals which are distributed over said contiguous surfaces and which occupy a minor area of said contiguous surfaces.

2. The electrochemical cell of claim 1 wherein said minor area do not exceed 40% of the surface area of said absorbent means.

3. The electrochemical cell of claim 2 wherein said minor area do not exceed 10% of the surface area of said absorbent means.

4. The electrochemical cell of claim 1 wherein said thin film has a thickness up to 2 mils (0.005 cm).

5. The electrochemical cell of claim 4 wherein said mat has a minimum thickness of 2 mils (0.005 cm).

6. The electrochemical cell of claim 1 wherein said thin film is comprised of a member of the group consisting of graft polyethylene and graft polypropylene.

7. The electrochemical cell of claim 6 wherein said thin film is comprised of radiation grafted polypropylene.

8. The electrochemical cell of claim 7 wherein said separator means and said absorbent means are in the configuration of a heat sealed container.

9. The electrochemical cell of claim 8 wherein said cathode is comprised of a member of the group consisting mercuric oxide and silver oxide.

10. An electrochemical cell comprising an anode, a cathode, a fluid electrolyte, a thin film radiation grafted polypropylene film as cell separator, and at least one mat of non-woven polypropylene fibers as cell electrolyte absorbent, with said film and said mat positioned between said anode and cathode and having contiguous surfaces which surfaces are thermally adhered to one another by heat seals which are distributed over said contiguous surfaces in an area not exceeding 40% of the surface area of said absorbent, between said anode and cathode.

11. The electrochemical cell of claim 10 wherein said cathode is comprised of mercuric oxide.

12. The electrochemical cell of claim 11 wherein said anode is comprised of zinc.

* * * * *